June 26, 1962 P. A. SIDELL 3,041,520
MOTOR AND SPEED INDICATING APPARATUS
Filed July 16, 1958

INVENTOR.
PHILIP A. SIDELL
BY
Carlsen, Pitzner, Hubbard & Wolf
ATTORNEYS

United States Patent Office 3,041,520
Patented June 26, 1962

3,041,520
MOTOR AND SPEED INDICATING APPARATUS
Philip A. Sidell, West Hartford, Conn., assignor to Barber-Colman Company, Rockford, Ill., a corporation of Illinois
Filed July 16, 1958, Ser. No. 748,977
3 Claims. (Cl. 318—490)

This invention relates to direct current motors having a governor switch connected in an energizing circuit for one or more windings of the motor and operating, in response to changes in the speed of the motor, to complete and interrupt the circuit so as to maintain the motor at a desired speed.

The primary object of the present invention is to utilize current fluctuations in the winding energizing circuit in a novel manner to indicate when the motor speed is near the desired value.

Another object is to provide a novel speed indicating mechanism which is capable of distinguishing between the abrupt changes of energizing current when the governor switch is opening and closing near the desired motor speed and the gradual current changes when the speed deviates from the desired speed enough that the switch remains either open or closed.

A more detailed object is to utilize the abrupt current changes to apply a breakdown voltage to a glow discharge device such as a neon tube and thereby provide a visual indication that the motor is operating near its desired value.

Figure 1:
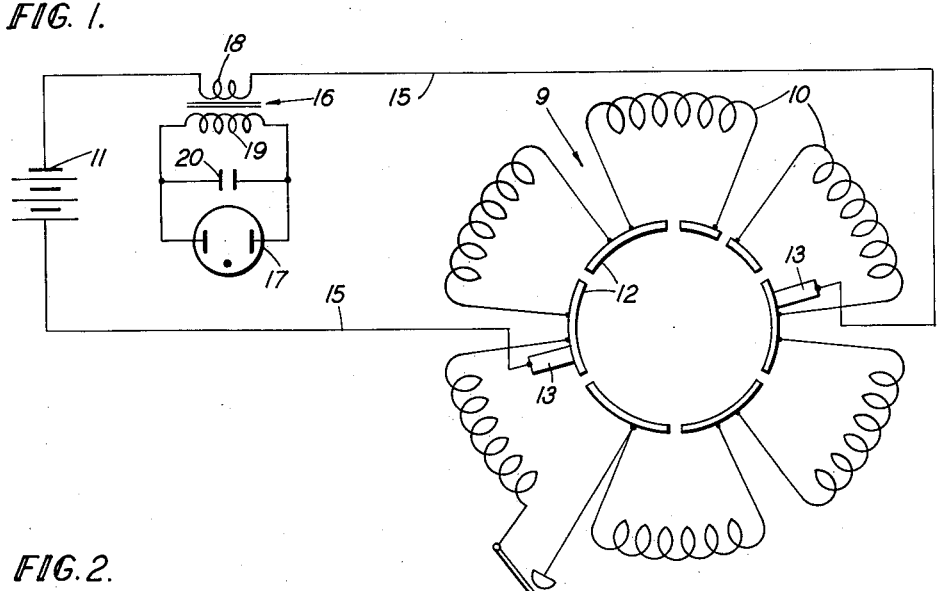

Other objects and advantages of the invention will become apparent from the following detailed description taken in connection with the accompanying drawings, in which FIGURE 1 is a schematic view and wiring diagram of a motor and speed indicator embodying the novel features of the present invention.

Figure 2:
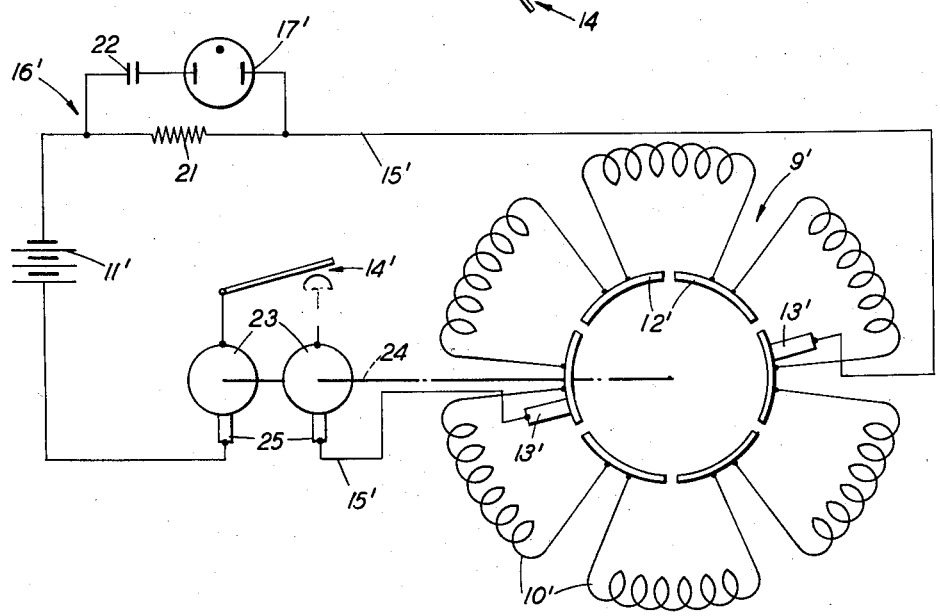

FIG. 2 is a schematic view and wiring diagram of a modified motor and indicator.

The present invention is especially suited for use with a direct current motor 9 of the so-called commutator type like those disclosed in Patent No. 2,819,441 granted to Willard E. Buck and in my copending application Serial No. 652,509, filed April 12, 1957 and issued August 19, 1958 as Patent No. 2,848,676. Generally, such motors comprise a stationary field provided by stationary windings or permanent magnets (not shown) and a rotatable armature including a plurality of windings 10. The latter are energized from a suitable source 11 of direct current through commutator segments 12 connected to and rotatable with the windings and engaged by angularly spaced stationary brushes 13 connected to the source.

To provide a governing action and thereby maintain the motor speed near a desired value, the energizing circuit for at least one of the armature windings 10 includes a switch 14 responsive to the motor speed and operable to interrupt and complete the energizing circuit respectively as the motor speed rises above and falls below the desired value. Various arrangements of the switch, the commutator segments 12 and the windings may be used to achieve such a governing action, for example, any of the arrangements disclosed in the Buck patent and my copending application referred to above, the arrangement shown in FIG. 1 of the instant application being similar to that of FIGS. 3 and 4 of my copending application.

Referring to FIG. 1, it will be seen that the motor 9 comprises six armature windings 10 and seven commutator segments 12. Five of the latter are of the same circumferential extent and the remaining two are shorter. Each of the shorter segments is connected to only one of two adjacent windings but each of the longer segments is connected to two windings. The windings thus are connected in series between the two shorter segments, a switch 14 being located in the connection between the segment diametrically opposite the shorter segments and one of the windings associated with this segment.

The FIG. 1 arrangement of the switch 14, the windings 10 and the segments 12 results in energization of approximately half of the windings during each full revolution of the armature while the motor speed is below the desired value so that the switch remains closed. When the speed exceeds the desired value and the switch remains open, three of the windings are energized for only a minor portion of each revolution, for example, one-sixth of each revolution, depending on the angular spacing of adjacent segments and the overlap of each brush 13 with adjacent segments.

It will be apparent that, when the motor speed is below the desired value so that the governor switch 14 is closed, the current flowing in the circuit through the brushes 13, the source 11 and conductors 15 connecting the source and the brushes is substantially constant in successive revolutions except for small variations accompanying the commutator action. However, when the speed reaches the desired value so that the switch opens, the current becomes intermittent and changes abruptly between zero and its normal value. The character of the current thus varies with changes of the motor speed.

The present invention contemplates utilizing the differences in the character of the armature current at different motor speeds to determine when the speed has reached the desired value at which the switch 14 operates. This is accomplished by the provision of novel means 16 for distinguishing between gradual changes or a constant value of armature current and abrupt changes and producing a voltage to actuate a signal device 17 when abrupt changes are taking place. When the armature current is changing gradually or is constant, insufficient voltage is produced to actuate the signal device.

In one form shown in FIG. 1, the sensing means 16 comprises a transformer having a primary winding 18 connected in series with one conductor 15 between the voltage source 11 and the motor 9 and a secondary winding 19 across which a voltage appears when only current flow through the primary is changing. While the signal device 17 may take various forms and register or record current changes, it is preferred to use a visual device in the form of a glow discharge tube, for example, a neon tube, and thereby keep the construction simple and the cost low. This tube is connected across the secondary and, when the secondary voltage reaches the breakdown voltage of the tube due to abrupt changes in the primary current, ionization of the gas takes place and the tube flows thereby providing a visual signal. When the primary current is changing gradually or is constant so that the secondary voltage drops, the tube is extinguished.

Means also is provided to avoid false actuation of the signal tube 17 in response to primary current pulses of shorter duration than those resulting from opening and closing of the governor switch 14, such pulses occurring, for example, as an incident to the commutator action of the brushes 13 and segments 12. This means is a capacitor 20 connected in parallel with the tube and serving to filter the secondary voltage pulses of very short duration.

By utilizing the transformer 16 as the means for sensing current changes in the winding energizing circuit, a sufficient voltage for operating the neon tube 17 even though the voltage of the source 11 is less than the breakdown voltage of the tube. Where the source voltage is large enough to operate the tube or other signal device, the current sensing means may take another form illustrated in FIG. 2, the parts in this modification which correspond to the parts in FIG. 1 bearing similar but primed reference characters.

Referring to FIG. 2, the modified sensing means 16' includes a resistor 21 connected in series with one of the conductors 15' between the source 11' and the motor 9' and providing a voltage variable with changes in the armature current flowing through the conductor. The distinction between abrupt and gradual changes of this voltage is made by connecting a capacitor 22 in series with the neon tube 17' across the resistor.

The construction of the motor 9' and the relation of the governor switch 14' thereto also are different in the modification of FIG. 2. Thus, the motor includes six armature windings 10' and six commutator segments 12' of equal angular extent each connected to two adjacent windings so that the latter are connected in a closed annular series. The centrifugal switch 14' although still mounted on and rotatable with the armature, is located between the voltage source 11' and one of the commutator brushes 13'. This location is made possible by connecting the switch contacts to two collector rings 23 rotatable with the motor shaft 24 and engaged by stationary brushes 25 which are connected respectively to the source and one of the commutator brushes.

In the operation of the FIG. 2 system, let it be assumed that the switch 14' has been closed a long enough time that the charge on the capacitor 22 equals the voltage drop across the resistor, the drop across the tube 17' then being approximately zero so that the tube is extinguished. When the switch opens to interrupt current flow through the resistor, the full voltage of the capacitor is applied across the tube and, being larger than the breakdown of the tube, causes the latter to fire. This completes a discharge path for the capacitor through the resistor and, when the capacitor voltage becomes insufficient to maintain the fired condition of the tube, the latter is extinguished.

The extinguished condition of the tube continues until the switch 14' is closed at which time the capacitor 22 acts as a momentary short circuit so that the full voltage of the source is applied across the motor 9' and the tube. The tube then fires to complete a charging circuit for the capacitor. When the capacitor charge equals the voltage drop across the resistor, the drop across the tube drops substantially to zero so that the tube is extinguished. Both opening and closing of the switch thus results in firing of the tube the same as in the preferred system of FIG. 1 so as to give a visual signal that the motor is operating near its regulated speed.

I claim as my invention:

1. In a speed-governed system for a motor armature circuit having a plurality of armature windings and a normally closed centrifugal switch normally operable to open the armature circuit during at least a portion of each armature period of rotation at a given governing armature speed and thereby decrease the speed below the governing speed, means for connecting said armature circuit across a single direct current energizing source, an impedance inserted in series with said armature circuit across said source, and a glow discharge device non-conductively coupled across said impedance and rendered conductive in response to abrupt current changes in the armature current occurring as the centrifugal switch opens and closes in the governing speed range for indicating operation in said speed range.

2. In a speed-governed system for a motor armature circuit having a plurality of armature windings and a normally closed centrifugal switch normally operable to open the armature circuit during at least a portion of each armature period of rotation at a given governing speed and thereby decrease the speed below the governing speed, means for connecting said armature circuit across a single direct current energizing source, an impedance inserted in series with said armature circuit across said source, a capacitor, and a glow discharge device connected in series with said capacitor across said impedance adapted to be rendered conductive by abrupt current changes in the armature circuit occurring as the centrifugal switch opens and closes in the governing speed range for indicating operation in said range.

3. In a speed-governed system for a motor armature circuit having a plurality of armature windings and a normally closed centrifugal switch normally operable to open the armature circuit during at least a portion of each armature period of rotation at a given governing speed and thereby decrease the speed below the governing speed, means for connecting said armature circuit across a single direct current energizing source, a transformer having a primary winding inserted in series with said armature circuit across said source, and a glow discharge device connected across the secondary winding of said transformer adapted to be rendered conductive by abrupt current changes in the armature circuit occurring as the centrifugal switch opens and closes in the governing speed range for indicating operation in said range.

References Cited in the file of this patent

UNITED STATES PATENTS

| 2,130,440 | Willis | Sept. 20, 1938 |
| 2,738,391 | Tesh | Mar. 13, 1956 |

FOREIGN PATENTS

| 429,478 | Great Britain | May 30, 1935 |